United States Patent
Yoshitsugu et al.

[11] Patent Number: 5,906,440
[45] Date of Patent: May 25, 1999

[54] DYNAMIC PRESSURE TYPE FLUID BEARING DEVICE

[75] Inventors: Takao Yoshitsugu, Yonago; Koichiro Ohata; Taehiro Matsumoto, both of Saihaku-gun, all of Japan

[73] Assignee: Matsushita Electric Industrial Co., Ltd., Osaka-fu, Japan

[21] Appl. No.: 08/994,043

[22] Filed: Dec. 19, 1997

[30] Foreign Application Priority Data

Dec. 24, 1996 [JP] Japan .................................. 8-342975

[51] Int. Cl.⁶ ...................................................... F16C 17/02
[52] U.S. Cl. ............................................. 384/115; 384/448
[58] Field of Search ...................................... 384/115, 448, 384/114, 113, 100

[56] References Cited

U.S. PATENT DOCUMENTS 5,141,338   8/1992   Asada et al. .

FOREIGN PATENT DOCUMENTS 3-163212   7/1991   Japan .

*Primary Examiner*—Lenard A. Footland
*Attorney, Agent, or Firm*—Wenderoth, Lind & Ponack, L.L.P.

[57] ABSTRACT

A dynamic pressure type fluid bearing device includes a rotary shaft, a hollow sleeve in which the rotary shaft is rotatably mounted, and at least two sets of dynamic pressure generating grooves formed in either an outer surface of the rotary shaft or an inner surface of the sleeve. In this construction, a value obtained from $k \times \sin \beta$ is made equal to about 0.1 or ranges from 0.09 to 0.12, where $k = d/e$, d is a width of the dynamic pressure generating grooves, e is an interval between neighboring dynamic pressure generating grooves, and $\beta$ is an angle of the dynamic pressure generating grooves relative to a direction of rotation of the rotary shaft.

8 Claims, 2 Drawing Sheets

DYNAMIC PRESSURE TYPE FLUID BEARING DEVICE

BACKGROUND OF THE INVENTION

1. Field of the Invention

The present invention relates generally to a dynamic pressure type fluid bearing device suited for use in a laser printer and, particularly, in a motor of a scanner having a polygon mirror which requires highly accurate and high speed rotation.

2. Description of Related Art

FIG. 3 depicts one of the dynamic pressure type fluid bearing devices suited for use in high speed rotation, as disclosed in Japanese Laid-open Patent Publication (unexamined) No. 3-163212. The dynamic pressure type fluid bearing device as shown therein comprises a shaft 1, a hollow sleeve 2 in which the shaft 1 is rotatably inserted, and two sets of dynamic pressure generating grooves 8 and 9 formed in either the outer surface of the shaft 1 or the inner surface of the sleeve 2. This dynamic pressure type fluid bearing device has a space 7 defined between the two sets of dynamic pressure generating grooves 8 and 9. Air trapped in such a space 7 expands under the influence of heat generated during high speed rotation and then escapes outside. In order to easily and smoothly discharge the air, the dynamic pressure generating grooves 8 and 9 have hitherto been formed so as to have an acute angle of less than 20 degrees relative to the direction of rotation of the shaft 1 and a depth of more than 4 $\mu$m so that the resistance to flow may be reduced. This construction prevents the air from remaining inside the bearing device during rotation and attains a stable rotation of the shaft 1.

However, all the dynamic pressure type fluid bearing devices do not have a completely well-balanced shaft. High speed rotation of an unbalanced shaft tends to cause whirling of the shaft which in turn brings about the so-called squeezing action in which the pressure of a lubricating oil is increased and causes the lubricating oil to escape from the bearing device. Because the acute angle of the dynamic pressure generating grooves 8 and 9 reduces the dynamic pressure generated within the bearing device and, hence, is disadvantageous to the squeezing action, the conventional dynamic pressure type fluid bearing devices are not satisfactory in terms of durability.

Furthermore, it has become known that when the circumferential speed of the shaft exceeds 1 m/s, air discharge is hindered under the influence of the centrifugal force of the lubricating oil as the dynamic pressure generating grooves 8 and 9 become deep.

SUMMARY OF THE INVENTION

The present invention has been developed to overcome the above-described disadvantages.

It is accordingly an objective of the present invention to provide a dynamic pressure type fluid bearing device capable of achieving highly accurate and high speed rotation of a shaft and stable lubrication.

In accomplishing the above and other objectives, the dynamic pressure type fluid bearing device according to the present invention comprises a rotary shaft, a hollow sleeve in which the rotary shaft is rotatably mounted, and at least two sets of dynamic pressure generating grooves formed in one of an outer surface of the rotary shaft and an inner surface of the sleeve, wherein a value obtained from k×sin $\beta$ is made equal to about 0.1 or ranges from 0.09 to 0.12, where k=d/e, d is a width of the dynamic pressure generating grooves, e is an interval between neighboring dynamic pressure generating grooves, and $\beta$ is an angle of the dynamic pressure generating grooves relative to a direction of rotation of the rotary shaft.

In the above-described construction, the width of the dynamic pressure generating grooves is determined depending on the angle of the grooves relative to the direction of rotation of the rotary shaft. When the angle of the grooves is small, air discharge therethrough is made smooth by enlarging the width of the grooves, while an undesirable discharge of a lubricating oil from bearing portions of the sleeve is restrained by reducing the pressure of the lubricating oil which may be increased by the squeezing action.

By so doing, it is possible to prevent a reduction in the life of the bearing device which has hitherto been caused by reducing the angle of the grooves and also prevent air retention in the bearing portions which hinders the rotational stability at high speeds. In addition, it is possible to further deepen the dynamic pressure generating grooves.

In the case where the bearing device is used under the condition in which the rotary shaft rotates at relatively low speeds, it is favorable to reduce the ratio k and increase the angle $\beta$ to thereby increase the bearing rigidity.

It is preferred that the angle $\beta$ of the dynamic pressure generating grooves is an acute angle of less than 15 degrees. When the rotary shaft rotates at several tens of thousands revolutions per minute or at a high circumferential speed more than 1 m/sec, this angle is particularly effective to enhance the rotational performance and the capability of holding the lubricating oil.

It is also preferred that the ratio k ranges from 0.35 to 0.65. This range makes the width of the grooves substantially equal to that of non-groove portions and, hence, makes the amount of lubricating oil on the non-groove portions substantially equal to that within the grooves, thus smoothly introducing into the grooves that portion of the lubricating oil which has hitherto been discharged outside by the squeezing action, and enhancing the reliability of the bearing device.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on application No. 8-342975 filed in Japan, the content of which is incorporated hereinto by reference.

Figure 1:
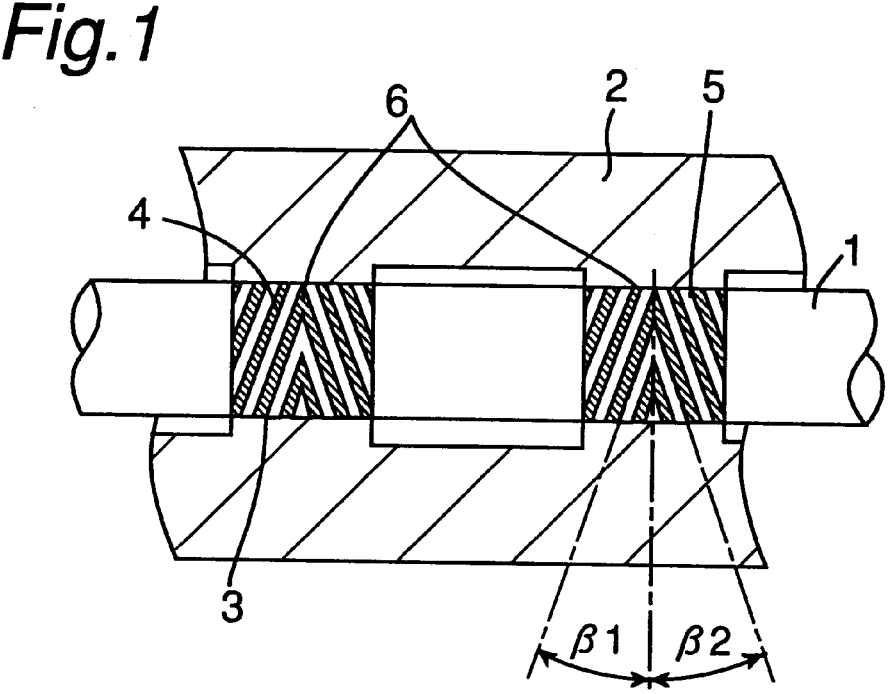
FIG. 1 is a longitudinal sectional view of a dynamic pressure type fluid bearing device according to the present invention.

Referring now to the drawings, there is shown in FIG. 1 a dynamic pressure type fluid bearing device according to the present invention, which comprises a rotary shaft 1 and a hollow sleeve 2 in which the rotary shaft 1 is rotatably mounted. The sleeve 2 includes two bearing portions 6 in which the rotary shaft 1 is journaled. Two sets of dynamic pressure generating grooves 4 and 5 are formed in either the outer surface of the rotary shaft 1 or the inner surface of the bearing portions 6 of the sleeve 2. The dynamic pressure generating grooves 4 and 5 have an angle of β1 or β2 relative to the direction of rotation of the rotary shaft 1.

Figure 2:
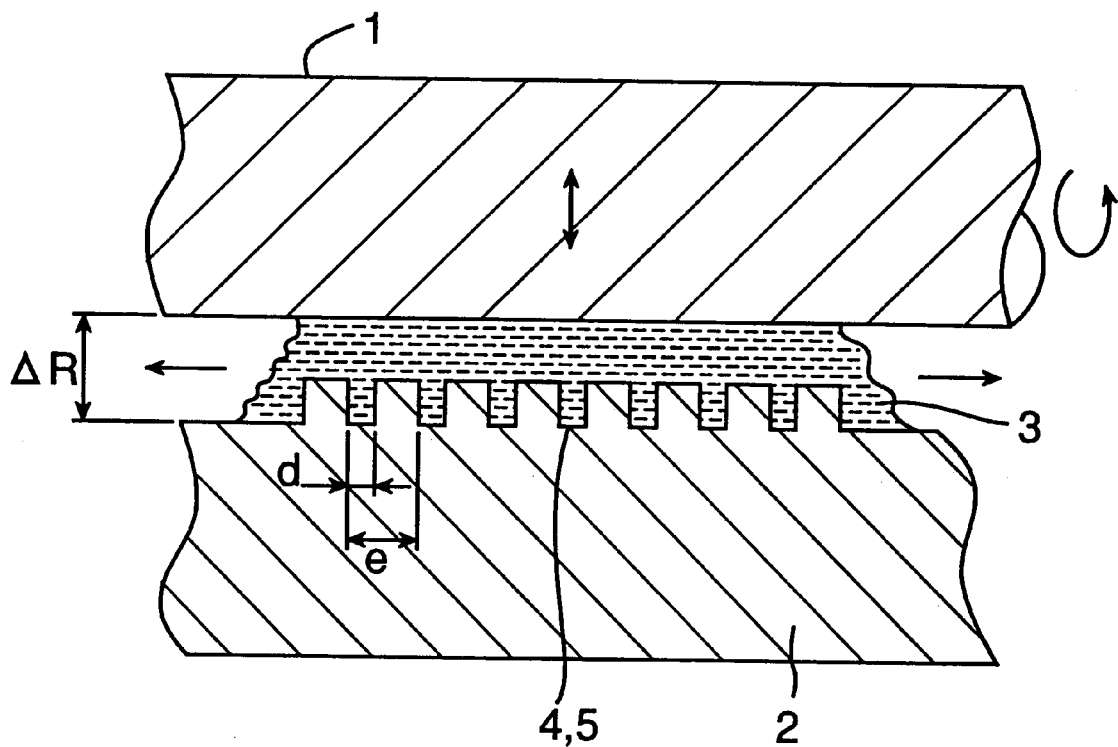
FIG. 2 is a partial sectional view, on an enlarged scale, of an essential portion of the fluid bearing device of FIG. 1.
Figure 3:
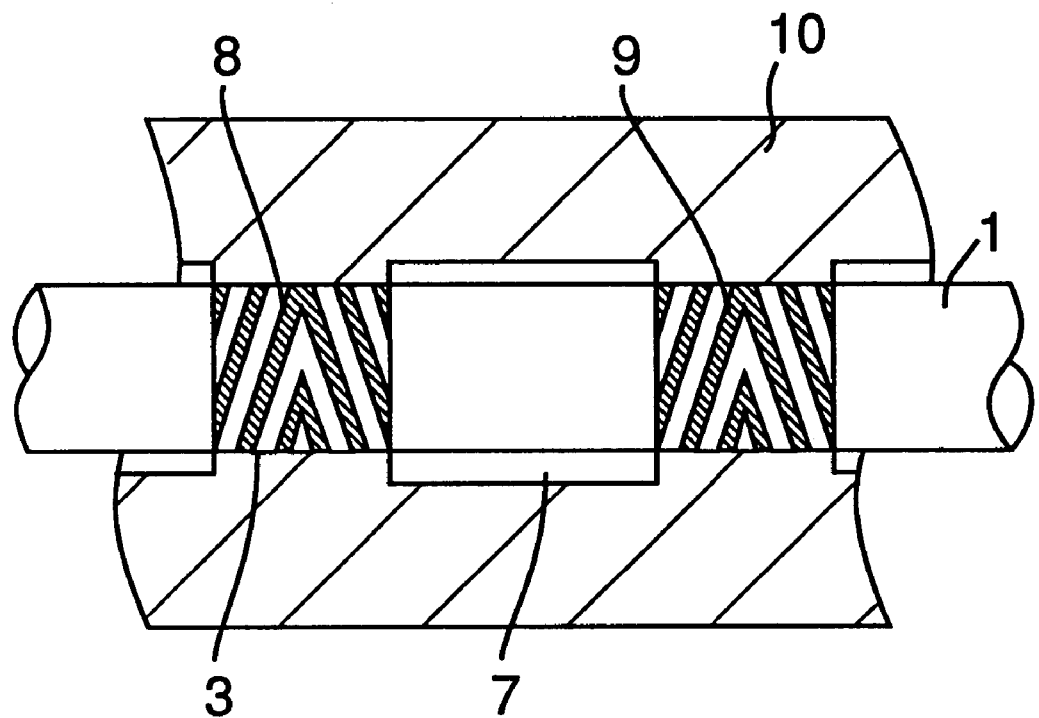
FIG. 3 is a view similar to FIG. 1, but depicting a conventional dynamic pressure type fluid bearing device.

As shown in FIG. 2, the dynamic pressure generating grooves 4 and 5 have a width of d and are equally spaced at intervals of e. The rotary shaft 1 is spaced apart from the bearing portions 6 of the sleeve 2 by a clearance ΔR in which a lubricating oil 3 is filled. When the ratio of groove width to groove interval is represented by k (k=d/e), the following relationship is established in the practice of the present invention.

$$k \times \sin \beta_1 (\text{or } \sin \beta_2) = \text{about } 0.1 (0.09 - 0.12)$$

Under such conditions, if the squeezing action is caused by, for example, whirling of the rotary shaft 1 due to unbalance thereof, the force acting on the surface of the bearing portions 6 becomes large in the presence of non-groove portions. This force acts to make the lubricating oil 3 flow along the dynamic pressure generating grooves 4 and 5. Such lubricating oil 3 is divided into one portion flowing toward the inside of the bearing device in a direction counter to the direction in which the pressure acts and the other portion escaping outside the bearing device. That portion of the lubricating oil 3 which escapes outside the bearing device is reduced by increasing the ratio of groove width to groove interval (k=d/e).

On the other hand, where the pressure escaping outside is high, it is sufficient if the angle of the dynamic pressure generating grooves 4 and 5 is increased to increase the dynamic pressure, but this makes the rotational stability worse because air discharge is also hindered at high speeds.

Setting the groove angles β1 and β2 and the ratio of groove width to groove interval k to the above-described relationship can maintain the balance between the rotational stability at high speeds and the capability of holding the lubricating oil.

Considering the amount of lubricating oil which would be discharged by the squeezing action, it is ideal to set the ratio of groove width to groove interval k to 0.5. However, when the tolerance in actual machining is considered, it is preferred that the ratio of groove width to groove interval k is in the range of 0.35–0.65. Experiments made so far have revealed that such setting is sufficiently effective.

In particular, at such a high speed that the circumferential speed of the rotary shaft 1 exceeds 1 m/sec, setting the groove angles β1 and β2 to less than 15 degrees further increases the performance of the bearing device.

It is to be noted that although in the above-described embodiment two sets of dynamic pressure generating grooves are formed in either the outer surface of the rotary shaft or the inner surface of the sleeve, the rotary shaft or the sleeve may have three or more dynamic pressure generating grooves.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A dynamic pressure type fluid bearing device comprising:

a rotary shaft;

a hollow sleeve in which said rotary shaft is rotatably mounted; and at least two sets of dynamic pressure generating grooves formed in one of an outer surface of said rotary shaft and an inner surface of said sleeve;

wherein a value obtained from k×sin β is made equal to about 0.1, where k=d/e, d is a width of said dynamic pressure generating grooves, e is an interval between neighboring dynamic pressure generating grooves, and β is an angle of said dynamic pressure generating grooves relative to a direction of rotation of said rotary shaft.

2. The dynamic pressure type fluid bearing device according to claim 1, wherein the angle of said dynamic pressure generating grooves is an acute angle of less than 15 degrees.

3. The dynamic pressure type fluid bearing device according to claim 2, wherein k ranges from 0.35 to 0.65.

4. The dynamic pressure type fluid bearing device according to claim 1, wherein k ranges from 0.35 to 0.65.

5. A dynamic pressure type fluid bearing device comprising:

a rotary shaft;

a hollow sleeve in which said rotary shaft is rotatably mounted; and at least two sets of dynamic pressure generating grooves formed in one of an outer surface of said rotary shaft and an inner surface of said sleeve;

wherein a value obtained from k×sin β ranges from 0.09 to 0.12, where k=d/e, d is a width of said dynamic pressure generating grooves, e is an interval between neighboring dynamic pressure generating grooves, and β is an angle of said dynamic pressure generating grooves relative to a direction of rotation of said rotary shaft.

6. The dynamic pressure type fluid bearing device according to claim 5, wherein the angle of said dynamic pressure generating grooves is an acute angle of less than 15 degrees.

7. The dynamic pressure type fluid bearing device according to claim 6, wherein k ranges from 0.35 to 0.65.

8. The dynamic pressure type fluid bearing device according to claim 5, wherein k ranges from 0.35 to 0.65.

* * * * *